United States Patent [19]

Cook

[11] Patent Number: 5,118,244
[45] Date of Patent: Jun. 2, 1992

[54] TRUCK BODY STRUCTURE AND DRIVEN MOVING FLOOR FOR SELF-UNLOADING

[76] Inventor: Peter P. Cook, Old Broad Cove Rd., St. Phillips, Newfoundland, Canada

[21] Appl. No.: 632,078

[22] Filed: Dec. 21, 1990

Related U.S. Application Data

[63] Continuation-in-part of Ser. No. 416,391, Sep. 22, 1989, abandoned.

[51] Int. Cl.⁵ .................................................. B60P 1/38
[52] U.S. Cl. ........................................ 414/528; 414/519; 280/789; 280/800; 198/832.1; 198/835; 298/23 MD; 296/181
[58] Field of Search ............... 414/527, 528, 501, 491, 414/519; 298/23 MD; 198/832.1, 835; 280/800, 781, 789; 296/181, 182, 183

[56] References Cited

U.S. PATENT DOCUMENTS

| | | | |
|---|---|---|---|
| 2,870,923 | 1/1959 | Jewell, Jr. | 414/528 |
| 3,593,864 | 7/1971 | Moser | 414/528 |
| 3,857,502 | 12/1974 | Holland et al. | 414/528 |
| 3,937,338 | 2/1976 | Cox | 414/528 |
| 4,232,884 | 11/1980 | DeWitt | 280/800 X |
| 4,664,583 | 5/1987 | Gust | 414/528 |
| 4,699,428 | 10/1987 | Vick | 298/23 MD |

FOREIGN PATENT DOCUMENTS

| | | | |
|---|---|---|---|
| 626767 | 7/1949 | United Kingdom | 414/528 |
| 715144 | 9/1954 | United Kingdom | 414/528 |
| 809022 | 2/1959 | United Kingdom | 414/528 |

Primary Examiner—Frank E. Werner
Attorney, Agent, or Firm—Stanley E. Johnson

[57] ABSTRACT

A self-unloading load hauling box for use on a towed carriage or carried by a powered mobile vehicle wherein the box is a rigid unit having a bottom wall with a floor plate and side walls and front end wall projecting up from the rigid bottom wall. An endless belt is looped around the bottom wall and runs on a driven roller at the rear end and an idler roller at the front end of the box. The endless belt is driven through an arc of selected length at spaced apart intervals to unload contents from the box. The jerky action from intermittently driving the belt has a tendency to cause a vibration, loosening the content in the box and thus results in a relatively even discharge during unloading. Between the upper run of the endless belt and the upper surface of the floor is a friction reducing pad which also absorbs shock loads tending to reduce damage to the belt and/or floor when loading heavy chunk material. The box has a tail gate mounted in such a manner that during an initial period of opening the tail gate, it restricts discharge of contents from the box and thereafter during further opening pivots freely providing an unrestricted discharge opening.

20 Claims, 4 Drawing Sheets

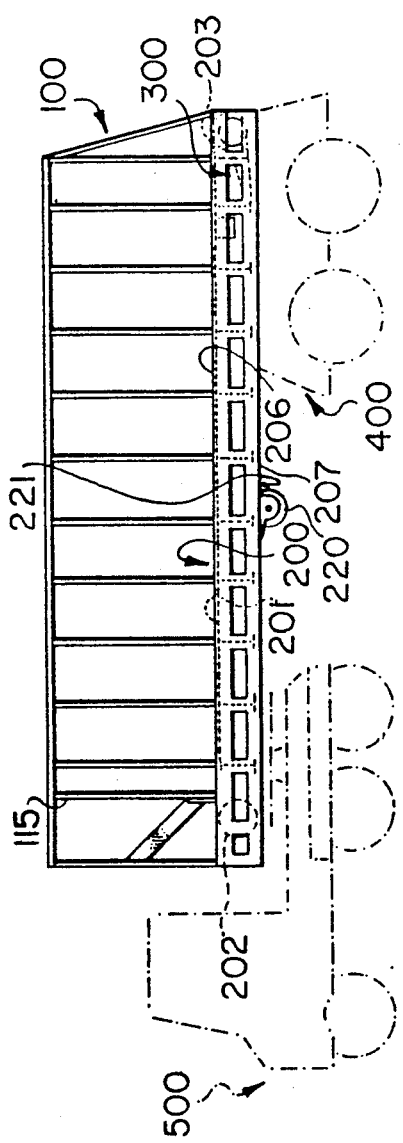
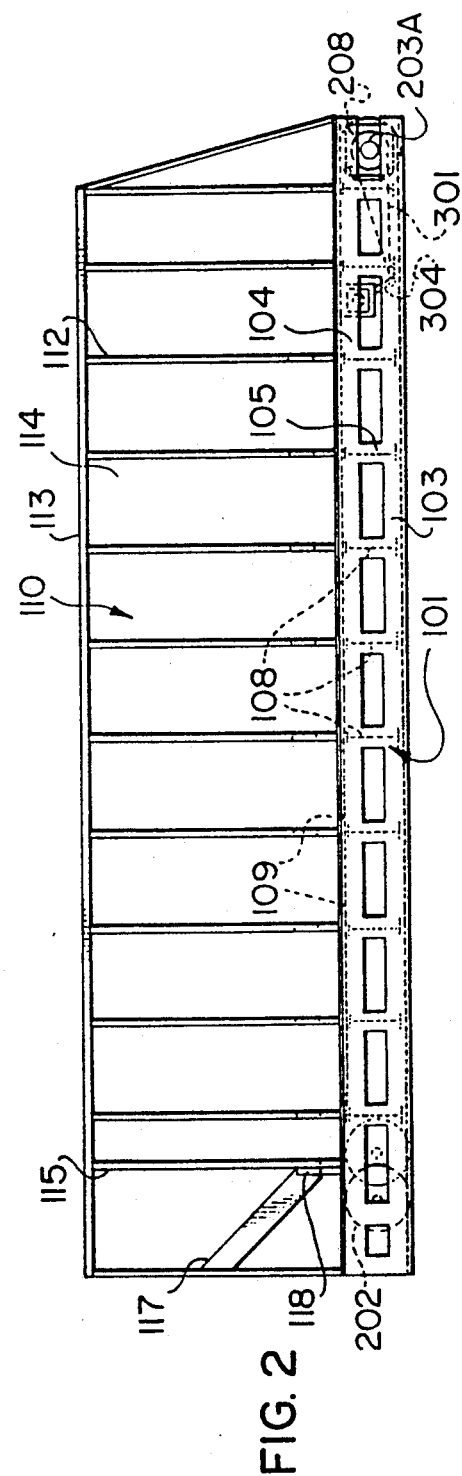
FIG. 1
FIG. 2

TRUCK BODY STRUCTURE AND DRIVEN MOVING FLOOR FOR SELF-UNLOADING

This application to a continuation-in-part of 9n07/416391 filed Sep. 22, 1989, now abandoned.

FIELD OF INVENTION

This invention relates generally to truck bodies for hauling bulk particulate and chunk material in quantities that weigh several tons and which includes a movable floor with a jerky motion for unloading the material. The invention also relates to a truck body construction and to a truck body of such construction with a tail gate for controlling the discharge rate during unloading.

BACKGROUND OF INVENTION

Conventionally dump trucks are used for hauling earth, rock, rubble, asphalt and the like material but they have shortcomings, particularly when hauling extremely large loads, related to the necessity of elevating the box to empty its load. There is instability during elevation of the box due to side wind loads, soft and/or uneven ground, load freezing, wet material, sticking, flat or soft tires, worn fifth wheels, bushings, hinge pins and worn or broken springs. One or a combination of these factors can lead to sideways tipping of the trailer and the attached tractor or the truck on which it is mounted as the case may be, normally resulting in extensive damage. Another shortcoming is the inability to elevate the box due to overhead restrictions such as wires or structures. A further shortcoming is the lack of load control during dumping leading to an inability to spread material evenly as for example, when attempting to spread a cold asphalt mix or gravel on a road surface.

A principal object of the present invention is to provide a self-unloading unit, whether it be a truck or trailer type, built to overcome at least some of the foregoing problems through the use of an endless belt conveyor system on the floor in a non-elevating box with a level bottom floor.

It is known in the art to have endless bar type conveyors on the bottom floor of a cargo box to unload the contents in the box as exemplified by the teachings in U.S. Pat. No. 3,819,072 issued Jun. 25, 1974 to Edward A. Reed, U.S. Pat. No. 3,647,096 issued Mar. 7, 1972 to J.H. Holland and Canadian Pat. No. 1,204,084 issued May 6, 1986 to Krause Manufacturing, Inc. It is also known to use a belt which covers the floor and on which the contents rest as exemplified by the teachings of Canadian Pat. No. 895,158 issued Mar. 14, 1972 to Western Sawdust Products, Inc. It is also known to use friction reducing means under the belt for example, as disclosed in U.S. Pat. No. 3,481,647 issued Dec. 2, 1969 to L.A. Cook. While moving floor self unloading boxes are known, none are particularly suitable for bulk material haulage because of the absence of any provision to suitably loosen the material.

SUMMARY OF INVENTION

A principal object of the present invention is to provide an improved conveyor belt system and an improved drive system for the same which not only unloads the bulk material from the box but also loosens the material for a more even outflow of the material.

Another object of the invention is to provide a rugged box structure incorporating an endless belt in the floor for unloading the contents of the box.

Another object of the present invention is to provide a simplified rigid rugged box structure and particularly one where the floor depth can readily be varied from one box to another without any other changes to the box.

Another object is to provide a tail gate mounted in such a manner that unloading therethrough is selectively restricted, controlling the rate of discharge, or unrestricted.

Considerations for the present design, which will become apparent hereinafter, include the capability to handle all types of materials including asphalt, gravel and the like and with a capability to continue dumping until all material is evacuated from the box. Another includes the incorporation of an inherent vibrating feature to aid in loosening stuck material. Another is the use of a slider bed floor instead of conveyor rollers beneath the belt to provide a solid base while giving some degree of cushioning for protection of the main floor and/or belt. Another is compatibility with either trailer or chassis design truck boxes. Another is the incorporation of a tail gate that selectively restricts unloading to control the rate of discharge, or alternatively, affords no restriction permitting a rapid rate of discharge of the load.

In accordance with one aspect of the present invention there is provided a self-unloading, load hauling box for use on a land vehicle load hauler, comprising a structurally rigid unit including a rigid bottom wall having a floor plate with an upper surface, side walls and a front end wall, said side and front walls projecting upwardly from said rigid bottom wall; conveyor belt unloading means comprising a first roller extending across said bottom wall at a discharge end thereof, a second roller extending across said bottom wall at a location forwardly of said first roller and an endless belt looped around said rollers and said bottom wall, said conveyor belt having an upper run that extends across and slides on said upper surface of said floor plate; and means drivingly connected to said first roller for driving the same stepwise through an arc of selected length at repeating spaced apart intervals of predetermined duration whereby together with belt stretch there results a jerky motion to the movement of the belt that facilitates unloading of the contents.

In accordance with another aspect of the invention, there is provided a robust rigid box unit for hauling bulk material comprising a first rail and a second rail providing a pair of lower spaced apart longitudinally extending lower side rails located respectively at opposite sides of said box, each of said side rails being generally Z-shape in cross section and having respectively an upper outwardly directed flange, a lower inwardly directed flange and a web interconnecting said flanges, a plurality of parallel spaced apart cross beams extending from one to the other of said first and second side rails and resting on said lower flanges, a floor plate resting on and supported by said cross beams, a side wall secured to and projecting upwardly from the upper flange of a respective one of said first and second lower side rails, and a front wall interconnecting said side walls in proximity of the front of the box, said side and front walls comprising posts, rails and plates and wherein said walls and components thereof and lower side rails are a weldment providing a robust box unit.

LIST OF DRAWINGS

The invention is illustrated by way of example in the accompanying drawings wherein:

FIG. 1 is a side elevational view of a tractor trailer embodiment incorporating a self-unloading box provided in accordance with the present invention;

FIG. 2 is an enlarged side elevational view of the box portion only shown in FIG. 1;

DESCRIPTION OF PREFERRED EMBODIMENT

Figure 3:
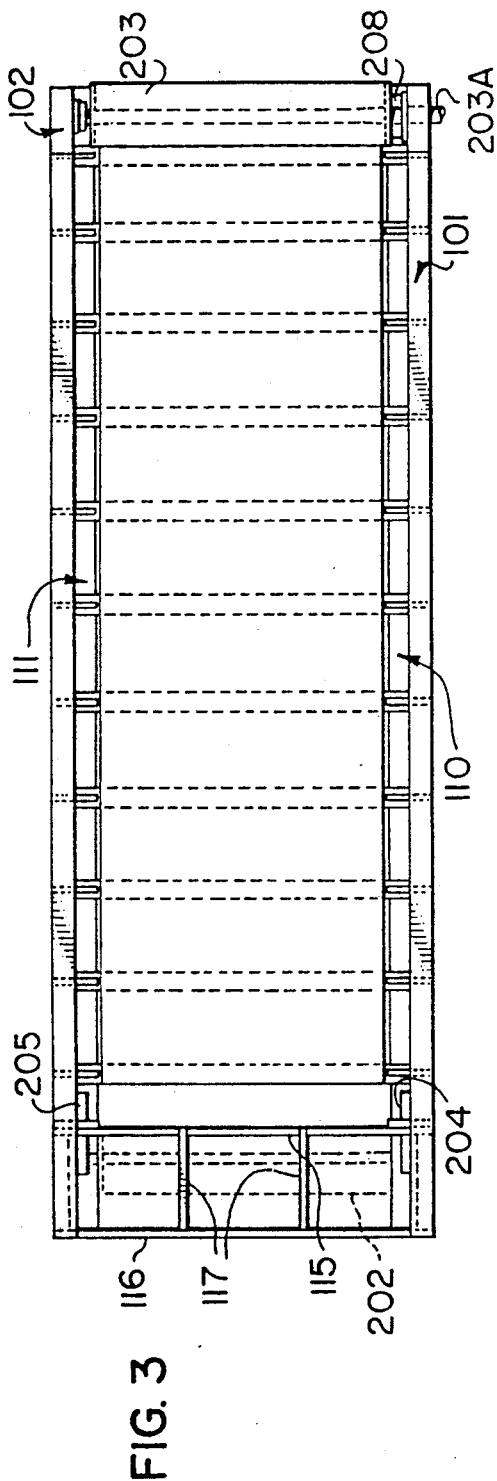
FIG. 3 is a top plan view of FIG. 2.
Figure 4:
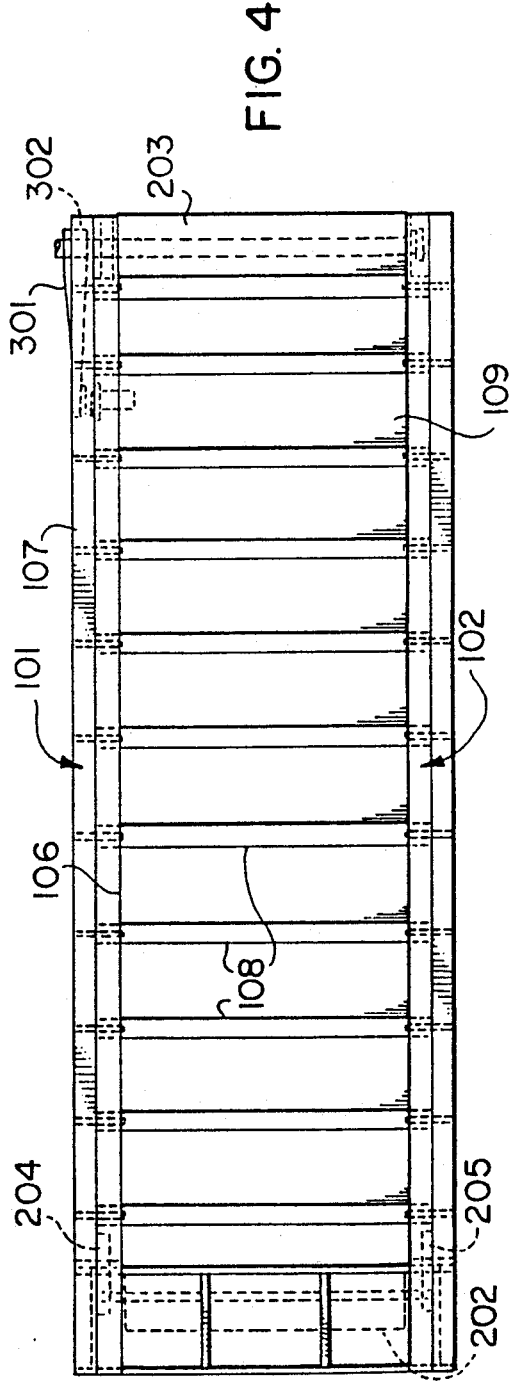
FIG. 4 is a bottom view of FIG. 2.
Figure 5:
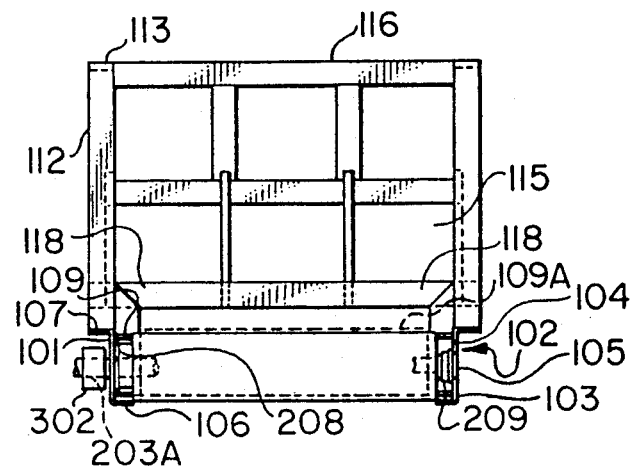
FIG. 5 is a righthand end elevational view of FIG. 2.

Illustrated in FIG. 1 is a robust rigid box unit 100 for hauling bulk material such as rocks, earth, tree roots, grub materials from land clearing, refuse from building demolition and/or the like, and which is self-unloading without having to be elevated as is the case with the conventional dump truck. The load is dumped by an endless belt conveyor unit 200 that includes an endless belt looped around the floor and driven intermittently, i.e. in a stepwise fashion by a drive unit 300. The conveyor drive unit is illustrated in detail in FIGS. 6 and 7 and will be described in detail hereinafter.

The box unit 100 is shown in FIG. 1, carried at one end by a bogey unit 400 and supported at the other end by way of a fifth wheel on a tractor 500. As will be obvious, the box 100 could be carried entirely by the truck or tractor unit 500 of conventional construction, but somewhat different from that illustrated in FIG. 1. Also it will be obvious the box 100 could be a tag along type trailer unit with the bogey 400 at the trailing end and a similar bogey at the leading end, but with steerable wheels. Mounting of the bogey wheel units and king pin for the fifth wheel and the like is by way of outer side rails on the box to be described more fully hereinafter. Hydraulic bogey units of the type for example, illustrated in U.S. Pat. No. 4,453,734 issued to J. McGhie et al Jun. 14, 1984; U.S. Pat. No. 4,460,194 issued to J. McGhie et al Jul. 17, 1984 and U.S. Pat. No. 4,468,047 can be used.

The rigid box unit is of all steel (or other rigid weldable material) construction and is a weldment of I beams under the floor, angles for the side rails (in the form of a Z shaped beam), hollow rectangular wall ribs and plate floor and walls. This is an independent rigid unit that can be mounted on any type of carrier.

As illustrated in detail in FIGS. 1 to 5, there are two parallel longitudinally extending, laterally spaced, side rails 101 and 102 each made from a pair of oppositely directed angle members 103 and 104 joined at spaced intervals by a series of gusset plates 105. Alternatively, each of the side rails may be a single or integral Z shaped beam providing in either case respectively an inwardly directed lower flange 106 and an outwardly directed upper flange 107. In either construction they are referred to herein as Z shape rails and in the preferred form the web portion of the rail is disposed vertically (at right angles to the flanges). Supported on the lower flange 106 and extending from one side rail 101 to the other side rail 102 are a plurality of crossbeams 108. The crossbeams 108 extend transverse to the length of the box and are spaced apart from one another longitudinally along the length of the box. The cross beams for example, may be wide flange (W14×22) I-beams and supported on the upper flange is a 3/16 inch heavy steel floor plate 109.

The box has a pair of opposed side walls 110 and 111, each consisting of a plurality of vertical side posts 112, resting on the upper flange 107 of the side rails and joined together at the top by a horizontal top rail 113. The inner side wall is a steel plate 114 extending from the floor plate to the top rail. From the construction, as will be evident, the floor can be varied readily in depth from one box to the next by merely changing the depth of I beam being used as the cross beam. In the preferred form the inner surface of the side wall is flush (in alignment) with the corresponding face of the web of the side rail. This results in being able to use floor beams 108 that are either deeper or shallower than the side rails and still have a box with a smooth inner wall.

The trailer has a front wall 115 having a plate on the inner face and reinforced on the outer side by a front top rail 116, a plurality of front diagonal posts 117, a front wall lower cross rail 118 and a series of vertical posts. The front wall rigidly attaches the front end of the respective side walls to one another.

The rear wall can be left open as is the case in the embodiment shown in FIGS. 1 to 5 or it can be provided with a tail gate, an embodiment of which is shown in FIGS. 8 to 12 and described in detail hereinafter.

The conveyor unloading unit 200 includes an endless belt 201 made from suitable width hinge joined belting. The belting is suitably reinforced and has preferably a nylon or similar slider backing. The belt is looped around a large for example, 16 inch diameter (crowned) idler roller 202 journalled for rotation at opposite ends on the respective side rails 101 and 102 at the front end of the box and a power driven roller 203 of similar size at the trailing end of the box. Each roller is of hollow construction as will be seen from FIG. 6. The drive roller 203 has rubber lagging or a like outer surface covering to increase frictional engagement with the belt.

The front roller is attached to the respective side rails 101 and 102 by respective take up units 204 and 205 for selectively adjusting the tension in the belt.

The belt 201 has an upper span or run 206 that lies flatwise on a friction reducing pad 109A made preferably of a suitable plastics material e.g. nylon, teflon, polyethylene or the like that lies flat on the floor plate 109. This pad not only is chosen to reduce friction with the belt taking into account the backing material on the belt, but also to provide a cushion reducing the affect of impact loads on the belt when handling chunk material. A belt friction reducing means consisting of an air cushion is disclosed in the aforementioned U.S. Pat. No. 3,481,647, but such is not considered suitable for the materials and loads to which the present box is intended to be subjected.

The belt has a lower or return run or span 207, located below the floor I-beams, which is supported by one or more rollers 220 extending across the full width of the belt. A scraper bar 221 (or bars) and/or brush may, if desired, be associated with the roller for removing debris from the surface of the belt.

The power driven roller 203 is journalled on the respective side rails 101 and 102 by respective bearings 208 and 209 and is driven stepwise or in increments by a one-way clutch and oscillating torque arm in the drive mechanism 300.

Figure 6:
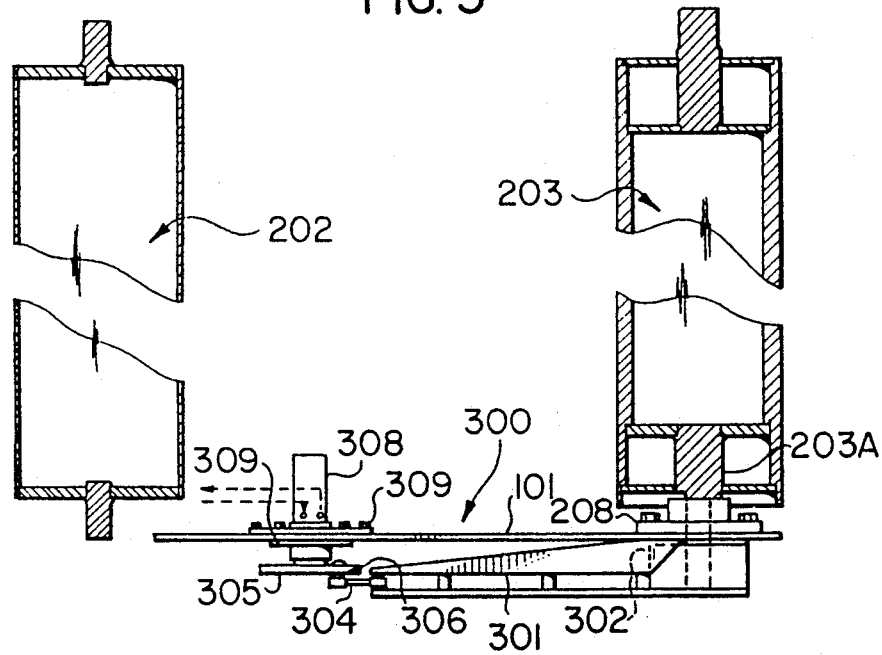
FIG. 6 is a top plan partial sectional view of the idler and driven roller for the conveyor and drive mechanism for the power driven roller.
Figure 7:
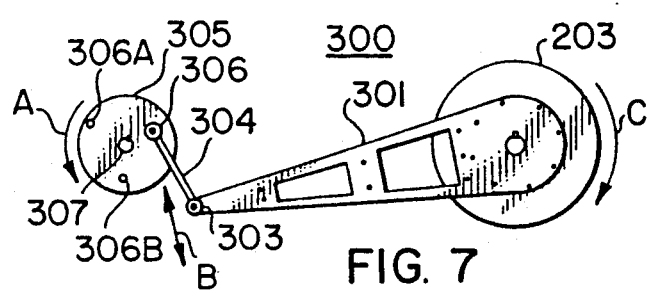
FIG. 7 is a elevational view of the roller drive mechanism shown in FIG. 6.

Referring principally to FIGS. 6 and 7, the drive mechanism includes a torque arm 301 incorporating a one-way clutch 302 (e.g. a *Sprag clutch or the like) in one end thereof which mounts such end of the torque arm on the drive shaft 203A of the roller 203. The other end of the torque arm 301 is connected as at 303 by way of a pivot pin to a connecting rod 304 which in turn is connected to a crank arm 305 as at 306 by a pivot pin. The crank arm 305 is mounted on the shaft 307 of a hydraulic motor 308. The hydraulic motor is mounted by way of flanges 309 to the lower side rail 101.

The crank arm 305 in the embodiment illustrated takes the form of a flange or disc attached to the motor shaft 307 and having a stub shaft projecting therefrom and on which the connecting rod is mounted by way of a suitable spherical roller bearing or the like. The flange has alternative mounting positions 306A and 306B for the stub shaft at differing radii allowing for selective adjustment in the characteristics of the drive. The flange is driven in the direction of arrow "A" which in turn causes oscillation of the free outer end of the torque arm represented by the double ended arrow "B". The oscillation stroke may for example, be about 6 to 8 inches on a torque arm length of 34 inches. The frequency or rate of oscillation may be for example, 160 strokes per minute causing the belt on for example, a 16 inch drum roll to travel at a speed of 25 feet per minute. Obviously the hydraulic motor speed can be varied as can the dimensioning of the drive linkages as can also the drum diameter to vary the rate and/or force for unloading. At maximum motor speed, one full box length of belt travel can be attained in about 1 minute, thereby providing an ability of dumping the entire load in a very short span. On conventional dump trucks the unloading time is about 5 minutes.

As viewed in FIG. 7, the upward stroke of the torque arm and engagement of the clutch cause the roller 203 to rotate in the direction of arrow "C". The clutch disengages on the return stroke of the torque arm. The clutch, if desired, can have means for reversing this permitting also driving the belt in the opposite direction to facilitate loading.

The roller or drum 203 is driven stepwise by the drive mechanism described in the foregoing, and this together with belt stretch and creep causes effectively a jerky motion in movement of the conveyor belt along the bottom of the box. This vibration or jerky action facilitates loosening stuck material and separating the pieces, thereby giving a more even discharge.

Referring now to FIGS. 8 to 12, there is illustrated an embodiment wherein a truck box of the foregoing type is provided with a movable gate that selectively provides during an initial opening of the gate a restricted discharge of the contents from the box and during further opening there is unrestricted discharge. The tail gate is pivotally mounted with the pivots being movable and guides are provided such that during an initial opening portion the gate slides providing a variable size restricted discharge opening and upon further opening the gate is free to pivot providing an unrestricted opening.

Figure 8:
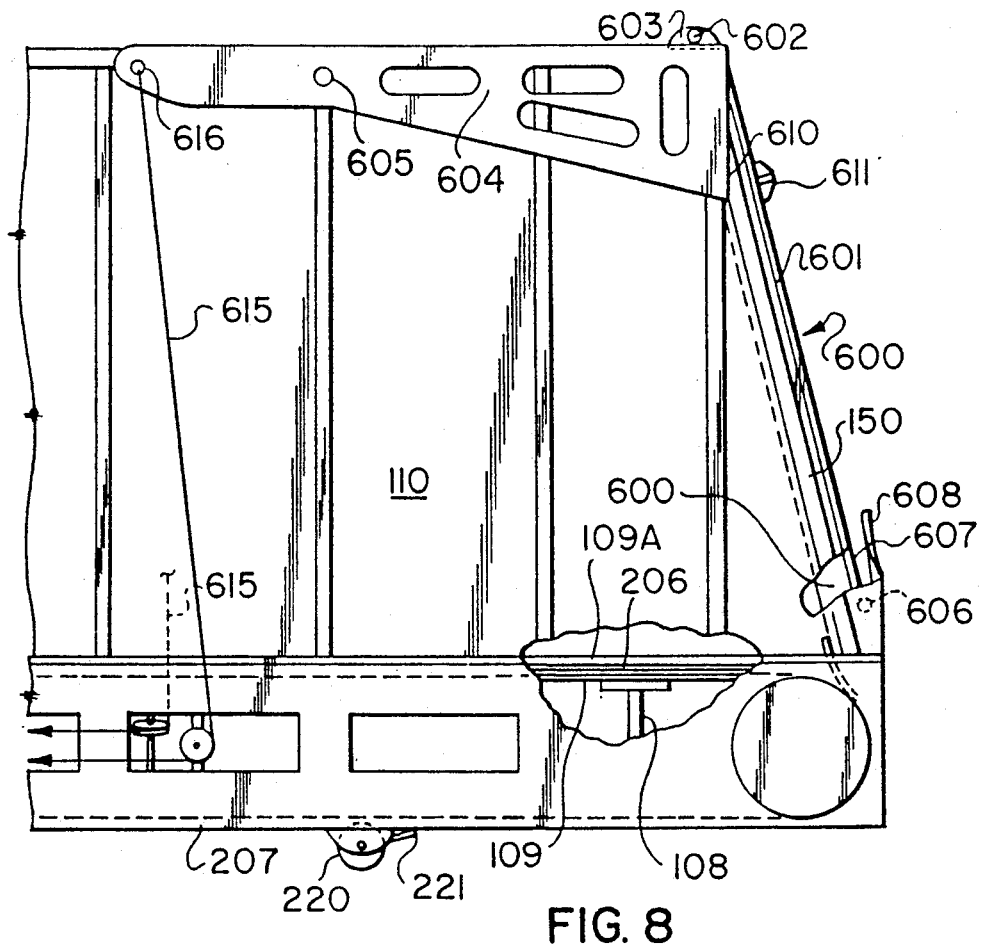
FIG. 8 is a side elevational view of the rear end portion of a truck box provided with a tail gate in accordance with the present invention.
Figure 9:
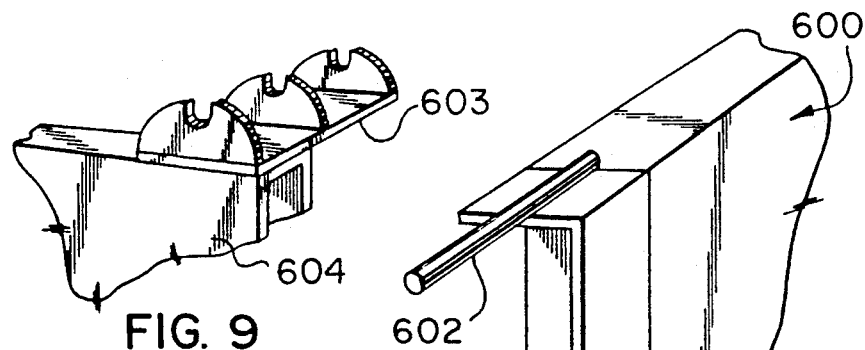
FIG. 9 is an oblique view of a rear end portion of one of a pair of lifting arms and pivot support for the tail gate.
Figure 10:
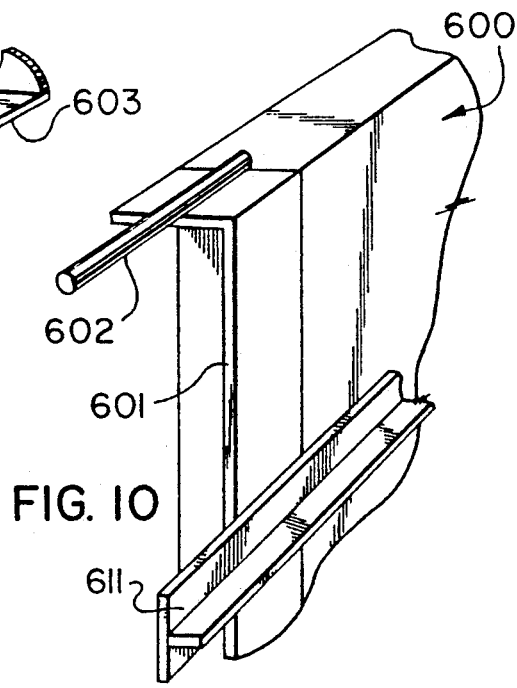
FIG. 10 is an oblique view of an upper end corner of the tail gate.

The tail gate, designated 600, is a weldment of plates and rails providing a rigid rectangular unit that closes the rear wall of the box. The tail gate projects into the box between the side walls thereof above the discharge belt and has outwardly directed side flanges 601 on opposite sides thereof that engages sloping end posts 150 on the box side walls 110 and 111. The two upper corners of the tail gate have a pivot mounting pin 602 projecting outwardly therefrom. These pins rest in a saddle 603 on respective ones of a pair of gate lifting arms 604 pivotally mounted on and located outboard of the boxes side walls. Only one lift arm 604 is shown in FIG. 8, mounted by pivot pin 605 on wall 110 and it will be understood the other of the two arms is similarly mounted on the side wall 111 of the truck box.

Each of the two lower corners have a guide pin 606 projecting laterally therefrom that slides in a guide slot 607 on the respective end post 150. The guide slots open at the top and each is provided by a flange 608 spaced from the post 150 and rigidly secured thereto. The guide pins, if desired, can be slidably mounted on the tail gate so as not to project at all times into the guide slots permitting the gate to pivot open without requiring initial sliding movement.

Each arm 604 has a lower abutment portion 610 that is engageable with a strike plate 611 extending laterally from the gate beyond the side wall end post 150. This engagement takes place after the arm 604 has pivoted sufficiently on pin 605 so as to raise pivot saddle 603 to the point where lower pins 606 are clear of flange 608. Further pivoting of the arms open the gate in an open position providing an unrestricted discharge of material from the box.

The arms 604 can be caused to pivot about their respective pin 605 mounting on the box side walls by hydraulic or pneumatic cylinders (not shown) or by a cable 615 attached as at 616 to the arm at one end and having the other end wound on a power driven winch drum. After discharge of the contents from the box, gravity can be relied upon after slacking cable 615 to return the gate to its closed position.

In the foregoing the gate 600 is described and in the drawings is illustrated in association with a moving floor type self-unloading box. It is however to be understood the disclosed tail gate may also, if desired, be used with any other type of box including dump truck boxes. The initial sliding movement of the gates provides a selectively variable in size discharge opening restricting and thereby controlling discharge of the content from the box. After the initial sliding movement the gate is free to pivot thereby providing a substantially unrestricted discharge opening. Engagement of the arms 604 with the gate permits opening the gate for complete unrestricted flow of the contents from the box.

I claim:

1. A self-unloading, load hauling, box for use on a land vehicle load hauler for hauling pieces of material, comprising a structurally rigid unit including a rigid bottom wall having a floor plate with an upper surface, side walls and a front end wall, said side and front walls projecting upwardly from said rigid bottom wall; conveyer belt unloading means comprising a first roller extending across said bottom wall at a discharge end thereof, a second roller extending across said bottom wall at a location forwardly of said first roller and an endless belt made of stretchable material looped around said rollers and said bottom wall, said conveyer belt having an upper run that extends across and slides on said upper surface of said floor plate; and means drivingly connected to said first roller for selectively driving the first roller about an axis of rotation stepwise through an arc of selected length at repeating spaced apart intervals of predetermined duration, wherein said first roller drive means includes a torque arm, a clutch selectively coupling said torque arm with said first roller to rotate the first roller stepwise upon oscillation of the torque arm, and power means connected to said torque arm for selectively oscillating the torque arm to intermittently drive said first roller, whereby intermittent driving of said belt through intermittent driving movement imparted to it by said first roller, in combination with belt stretch, causes a jerkey motion in movement of the belt along the bottom of the box which loosens stuck pieces of material to facilitate unloading of the material.

2. The apparatus of claim 1 wherein said power means for oscillating said torque arm comprises a power driven crank arm and a connecting rod pivotally attached at spaced apart positions thereon respectively, to said crank arm and said torque arm.

3. The apparatus of claim 1 wherein said torque arm is oscillated at a frequency in the range of 0 to 160 cycles per min. through an arc in a range of six to eight inches.

4. The apparatus of claim 1 including a friction reducing impact load absorbing pad on an upper surface of said floor plate.

5. The apparatus of claim 1 wherein said bottom wall includes a first longitudinal side rail and a second longitudinal side rail located respectively on opposite sides of said box and a plurality of parallel spaced apart cross beams extending from one side rail to the opposite side rail, said longitudinal side rails being generally Z shaped in cross section and having an upper outwardly directed flange and a lower inwardly directed flange, said flanges being generally horizontal and interconnected by a web, said cross beams resting on said lower flanges.

6. The apparatus of claim 5 including a tail gate mounted on said box at the trailing end thereof, said tail gate including pivot mounting means for said tail gate, means movably mounting said pivot mounting means on said box and means preventing pivotal movement of said tail gate during an initial period of moving said pivot mounting means to open the tail gate whereby during such initial period the tail gate devines a variable size opening restricting discharge of contents from the box.

7. The apparatus of claim 1 including means selectively to adjust the position of one roller relative to the other permitting adjusting tension in the endless belt.

8. A box unit as defined in Claim 1, including a tail gate, pivot mounting means for said tail gate, means movably mounting said pivot mounting means on said box and means preventing pivotal movement of said tail gate during an initial period of moving said pivot mounting means to open the tail gate whereby during such initial period the tail gate restricts discharge of contents from the box.

9. A truck box and tail gate as defined in claim 8 wherein said tail gate is pivotally mounted on a pair of arms pivotally attached respectively to a respective one of said side walls of the box located opposite one another.

10. A robust rigid box unit for hauling bulk material comprising a first rail and a second rail providing a pair of lower spaced apart longitudinally extending lower side rails located respectively at opposite sides of said box, each of said side rails being generally Z-shape in cross section and having respectively an upper outwardly directed flange, a lower inwardly directed flange and a web interconnecting said flanges, a plurality of parallel spaced apart cross beams extending from one to another of said first and second side rails and resting on said lower flanges, a floor plate resting on and supported by said cross beams, a side wall secured to and projecting upwardly from the upper flange of a respective one of said first and second lower side rails, and a front wall interconnecting said side walls in proximity at a front portion of the box, said side and front walls comprising posts, rails and plates and wherein said walls and components thereof and lower side rails are a weldment providing a robust box unit, and wherein an inner surface of each said side wall extends substantially in a same plane as a plane of the web of an associated side rail.

11. A robust rigid box unit as defined in claim 10 including an endless belt looped around said floor plate and cross beams that support such plate, an idler roller journalled on said side rails adjacent a front end of the box and a power driven roller mounted on said side rails adjacent an opposite discharge end of the box said endless belt being looped around and running in drive relation on said idler roller and power driven roller.

12. The apparatus of claim 11 including wherein said power driven roller has drive means that moves the roller intermittently.

13. The apparatus of claim 12 wherein said roller is moved intermittently at a selected frequency through an arc of predetermined length.

14. The apparatus of claim 10, wherein said Z-shape rails have the web portion thereof disposed substantially vertically.

15. The apparatus of claim 14, wherein said web and flanges of each rail are a solid one piece member.

16. The apparatus of claim 10 including a friction reducing impact load absorbing pad on the upper surface of said floor plate.

17. A truck box having a tail gate, pivot mounting means for said tail gate, means movably mounting said pivot mounting means on said box and means preventing pivotal movement of said tail gate during an initial period of moving said pivot mounting means to open the tail gate whereby during such initial period the tail gate restricts discharge of contents from the box and wherein said truck box comprises a structurally rigid unit including a rigid bottom wall having a floor plate with an upper surface and supported on a plurality of cross members, a first longitudinal lower side rail and a second longitudinal lower side rail located respectively on opposite sides of said box, said side rails being generally Z-shape in cross section with respective upper and lower horizontal flanges interconnected by a web and arranged with the lower flanges thereof facing one another, said floor supporting cross members resting on said lower flanges, side walls projecting upwardly from said side rails and a front wall interconnecting said side walls; a second roller extending across said bottom wall at a discharge end of the box and a second similar roller spaced forwardly therefor; an endless belt looped around said rollers providing a belt conveyor having an upper run that traverses and slidably rests on said upper surface of said floor plate and means drivingly connected to said first roller for selectively driving the same repeatedly through an arc of selected length at spaced apart intervals, wherein said drivingly connected means includes a torque arm, a clutch selectively coupling said torque arm with said first roller to rotate the same stepwise upon oscillation of the torque arm and power means connected to said torque arm to selectively oscillate the same.

18. The apparatus of claim 17, wherein said Z-shaped rails have the web portion thereof disposed substantially vertically.

19. The apparatus of claim 18, wherein said web and flanges of each rail are a solid one piece member.

20. A robust rigid box unit for hauling bulk material comprising a first rail and a second rail providing a pair of lower spaced apart longitudinally extending lower side rails located respectively at opposite sides of said box, each of said side rails being generally Z-shape in cross section and having respectively an upper outwardly directed flange, a lower inwardly directed flange and a web interconnecting said flanges, a plurality of parallel spaced apart cross beams extending from one to another of said first and second side rails and resting on said lower flanges, a floor plate resting on and supported by said cross beams, a side wall secured to and projecting upwardly from the upper flange of a respective one of said first and second lower side rails, and a front wall interconnecting said side walls in proximity of the front of the box, said side and front walls comprising posts, rails and plates and wherein said walls and components thereof and lower side rails are a weldment providing a robust box unit, and further including conveyor belt unloading means comprising a first roller extending across said bottom wall at a discharge end thereof, a second roller extending across said bottom wall at a location forwardly of said first roller and an endless belt made of stretchable material looped around said rollers and said bottom wall, said conveyor belt having an upper run that extends across and slides on said upper surface of said floor plate; and means drivingly connected to said first roller for intermittently driving the first roller about an axis of rotation stepwise through an arc of selected length at repeating spaced apart intervals of predetermined duration, wherein said first roller drive means includes a torque arm, a clutch selectively coupling said torque arm with said first roller to rotate the first roller stepwise upon oscillation of the torque arm, and power means connected to said torque arm for selectively oscillating the torque arm to intermittently drive said first roller, whereby intermittent driving of said belt through intermittent driving movement imparted to it by said first roller, in combination with belt stretch, causes a jerky motion in movement of the belt along the bottom of the box to facilitate loosening and separating stuck pieces of the material to facilitate unloading of the material.

* * * * *